June 20, 1967  F. C. GORDON  3,326,059
GEARS HAVING VIBRATION DAMPING MEANS
Filed Sept. 9, 1964  3 Sheets-Sheet 1
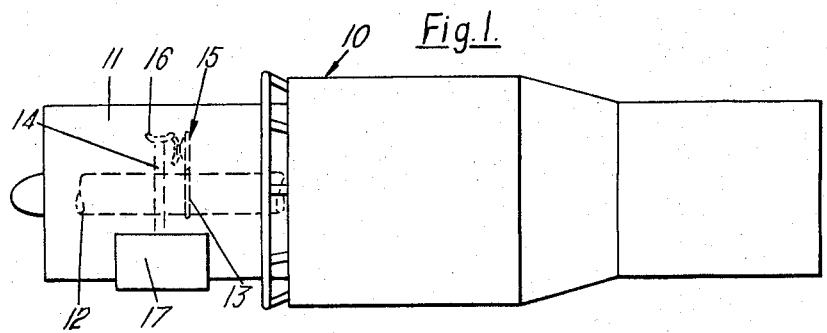
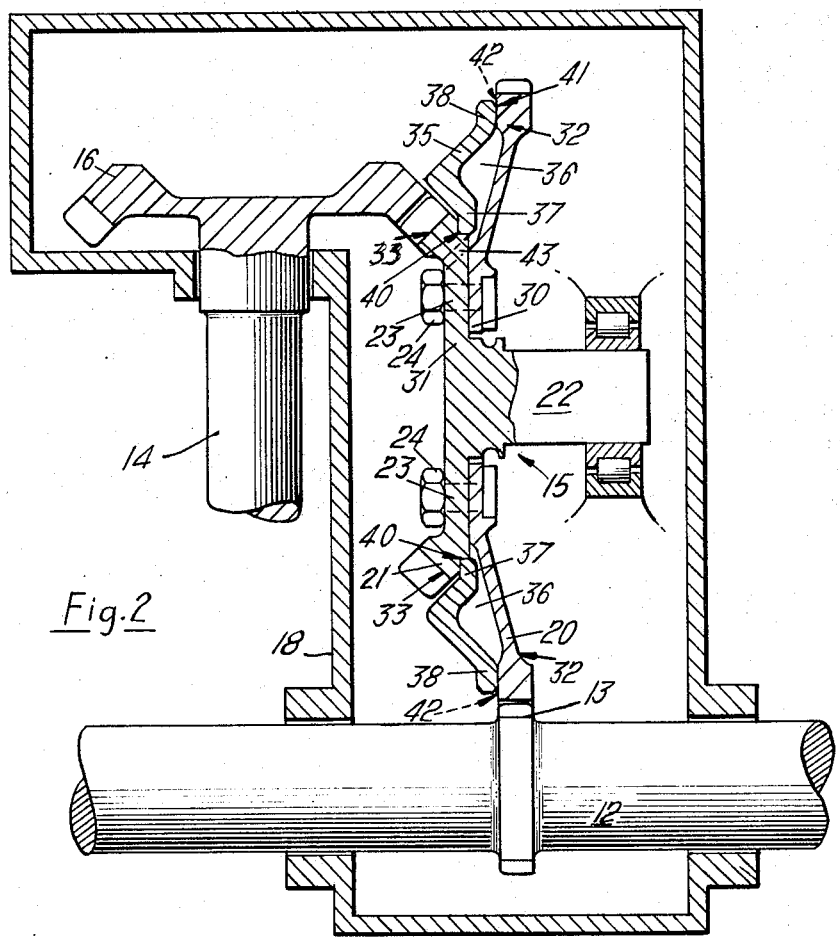

United States Patent Office 3,326,059
Patented June 20, 1967

---

3,326,059
GEARS HAVING VIBRATION DAMPING MEANS
Francis Charles Gordon, Littleover, Derby, England, assignor to Rolls-Royce Limited, Derby, England, a company of Great Britain
Filed Sept. 9, 1964, Ser. No. 395,159
Claims priority, application Great Britain, Sept. 20, 1963, 37,183/63
15 Claims. (Cl. 74—443)

This invention concerns a gear device and, although not so limited, it will hereinafter be described with reference to its use on gas turbine engines.

According to the present invention there is provided a gear device comprising a driving member, a driven member attached to or integral therewith, a resilient member extending between said driving and driven members being attached to or integral with one of said members and defining with said other member a chamber, and means for introducing fluid into said chamber whereby relative vibrations between said driving and driven members may be dampened.

Preferably there is provided an inlet and an outlet to said chamber, whereby fluid may flow continuously through said chamber from the inlet to the outlet thereof during operation of said device.

The resilient member may abut the other member, the arrangement being such that, when the pressure of fluid introduced into said chamber reaches a predetermined value, said resilient member is forced away from the member which it normally abuts, thereby providing an outlet for said fluid.

Preferably, the driving or driven member to which said resilient member is rigidly attached is apertured to provide inlets to said chamber.

The driving and driven member may be gear wheels which are generally concave in cross-section, having their radially inner portions abutting, and their radially outer portions spaced apart, said resilient member being annular, and being disposed between the radially outer portions of said driving and driven members.

Preferably, the apertures are disposed radially inwardly of the area in which said resilient member abuts the driving or driven member whereby fluid may pass from the inlet to the outlet of said chamber under action of centrifugal force.

Alternatively, the driving and driven members may be gear wheels having their radially outer portions abutting and their radially inner portions spaced apart, the radially outer portions of said resilient member and said other member being bolted together at angularly spaced locations and being spaced from one another between said spaced locations to form a plurality of angularly spaced apart recesses which together constitute said chamber.

The recesses may be provided by scallops formed in the face of said resilient member which abuts a plane face of said other member.

Preferably, the radially inner edges of said recesses are open, to provide inlets to said chamber, the radially outer edges normally being closed by the abutting resilient and other members but being adapted to move apart to provide outlets from said chamber.

In a preferred embodiment of the present invention, the gear device is disposed within a casing containing fluid, the fluid within said casing flowing during rotation of said gear device, through said inlet(s) through the chamber, and out through said outlet(s) thus returning to said casing.

The driving and driven members are preferably mounted on a lay-shaft within said casing, the driving member being adapted to be driven by a first gear wheel and said driven member being adapted to drive a second gear wheel. The first gear wheel may be mounted on the compressor shaft of a gas turbine engine, said second gear wheel forming part of the drive to an auxiliary of the engine.

The invention also includes a gas turbine engine provided with a gear device as set forth above.

The invention is illustrated, merely by way of example, in the accompanying drawings, in which:

FIGURE 1 is a view of a gas turbine engine provided with a gear device according to the present invention, FIGURE 2 is a part sectional elevation, to a larger scale than FIGURE 1 of part of the engine shown in FIGURE 1, illustrating the gear device in greater detail.

Figure 3:
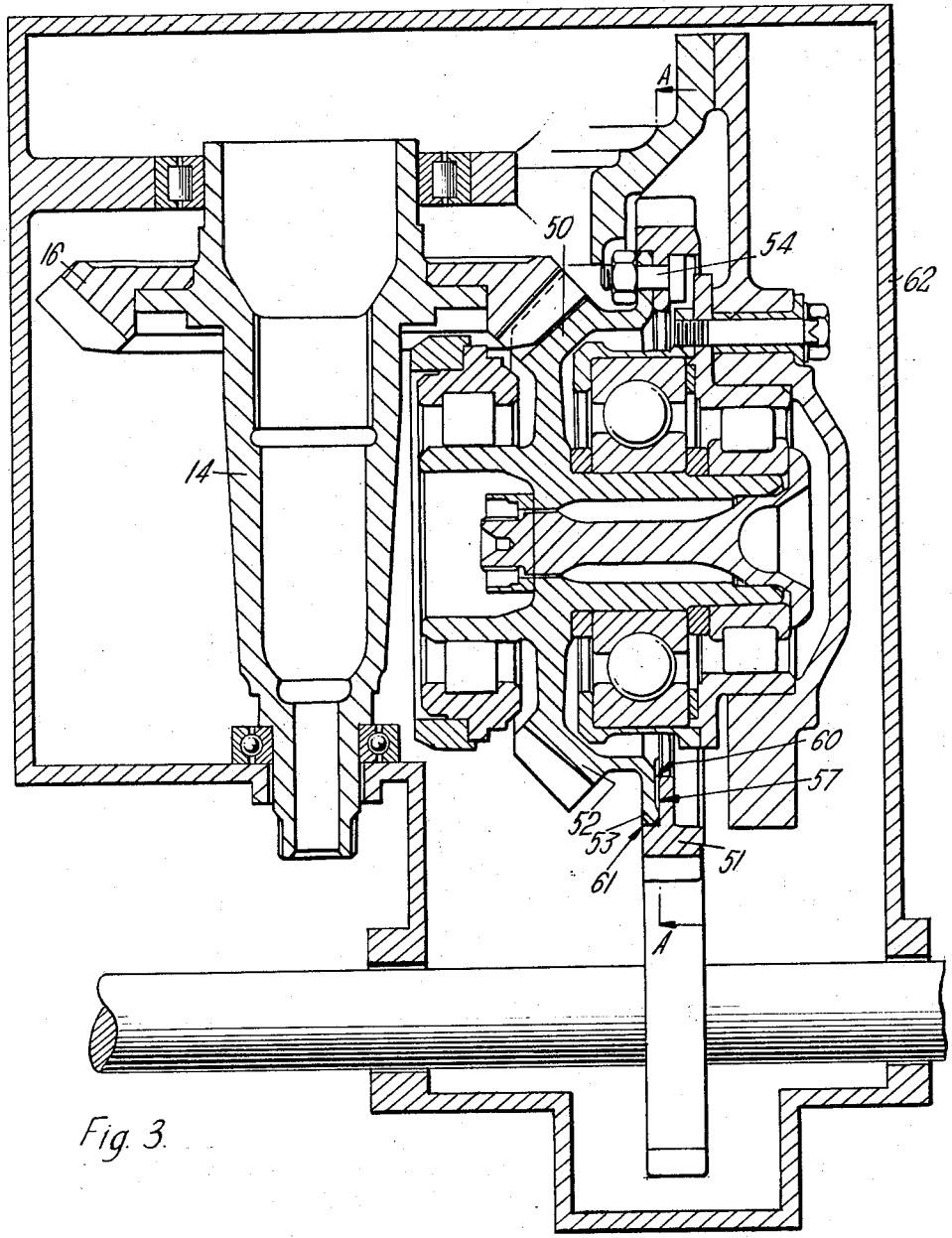
FIGURE 3 is a view similar to FIGURE 2 of an alternative embodiment of a gear device in accordance with the present invention.

Referring to FIGURE 1 of the drawings there is shown a gas turbine engine 10 having a compressor 11 mounted on a compressor shaft 12. Rigidly mounted on the compressor shaft 12 is a gear wheel 13 adapted to drive a shaft 14 by means of a gear device 15, teeth of which mesh with the gear wheel 13 and with a bevel gear 16 rigidly attached to the shaft 14. The shaft 14 is adapted to drive a blower 17 by means not shown.

Referring to FIGURE 2 the gear device 15 comprises a spur gear wheel 20 and a bevel gear wheel 21. The bevel gear wheel 21 is formed on a lay-shaft 22 mounted for rotation in a casing known as the "internal wheel case" of the engine and indicated at 18. The spur gear wheel 20 is rigidly attached to bevel gear wheel 21 by four bolts 23 and corresponding nuts 24.

As will be seen from FIGURE 2 the spur gear wheel 20 and bevel gear wheel 21 are generally concave in cross-section. Radially inner portions 30, 31 of spur gear wheel 20 and bevel gear wheel 21, respectively, abut one another, whilst radially outer portions 32, 33 thereof are spaced axially from one another.

An annular resilient metal member 35, which is substantially triangular in cross-section, is disposed between the radially outer portions 32, 33 and defines therewith an annular chamber 36. The annular resilient metal member 35 is disposed substantially radially, having an inner circumferential edge 37 and an outer circumferential edge 38. The inner circumferential edge 37 is mounted in an annular seating 40 on the bevel gear wheel 21 and forms an interference fit therewith. In a typical installation, with the annular seating 40 having a diameter of some 2.5 inches, this interference could, for example, be 0.002 to 0.003 inch. Thus the annular resilient metal strip 35 is rigidly attached to bevel gear wheel 21.

The outer circumferential edge 38 abuts a radially disposed annular face 41 of the outer portion 32 of spur gear wheel 20. A tight fit is formed between these abutting faces by "nipping" the other circumferential edge 38 to the face 41. In the typical installation mentioned above the axial nip between these faces may be of the order of 0.006 to 0.007 inch, i.e., the axial length of the annular member 35 between inner and outer circumferential edges 37, 38 is made 0.006 to 0.007 inch larger than the axial length between annular seating 40 and face 41.

The bevel gear wheel 21 is provided with three equispaced holes 43 which extend right through the wheel from one face to the other. The holes 43 communicate with the annular chamber 36 and provide inlets therefore.

The whole gear arrangement described above (excluding the shaft 14 and drive to the blower 17) is disposed within the "internal wheel-case" 18 of the gas turbine engine 10. The internal wheel-case 18 is a casing which surrounds the compressor shaft 12 and contains the gear drive from the compressor shaft for driving any auxiliary equipment associated with the engine 10. The "internal wheel-case" 18 is full of oil, within which the gear arrangement described above is partly immersed.

Upon rotation of compressor shaft 12, the gear wheel 13 will drive spur gear wheel 20, which in turn will act as a driving member to drive bevel gear wheel 21. The driven bevel gear wheel 21 will drive bevel gear 16, shaft 14 and generator 17. Under the centrifugal force generated, oil will pass from the internal wheel-case through holes 43 and into chamber 36.

As the rotational speed of compressor shaft 12 increases the pressure of the oil within chamber 36 increases. However, at a predetermined speed the pressure of the oil will be sufficient to overcome the load between the outer circumferential edge 38 and face 41 (formed by nipping these faces together) and the outer circumferential edge 38 will be forced away from face 41 such as to provide therebetween an annular gap 42.

In the typical installation mentioned above, the initial 0.006 to 0.007 inch nip may provide an initial load of say, 800 to 900 lbs. which may be overcome by oil pressure generated at compressor speed of, say, 5,000 to 5,500 r.p.m.

When annular gap 42 is formed, oil will immediately flow radially outwardly therethrough, returning to the "reservoir" formed by the oil in the internal wheel case. Thus the oil will circulate between the internal wheel case 18 and the chamber 36, passing radially through chamber 36 from the inlets formed by holes 43 to the outlet formed by annular gap 42.

The oil passing through chamber 36 dampens any relative vibrations set up between spur gear wheel 20 and bevel gear wheel 21. These relative vibrations can be very great at the normal running speed of the engine shafting, and may well lead to failure of the gearing. Thus the provision of the oil in chamber 36 prolongs the life of the gearing.

Figure 4:
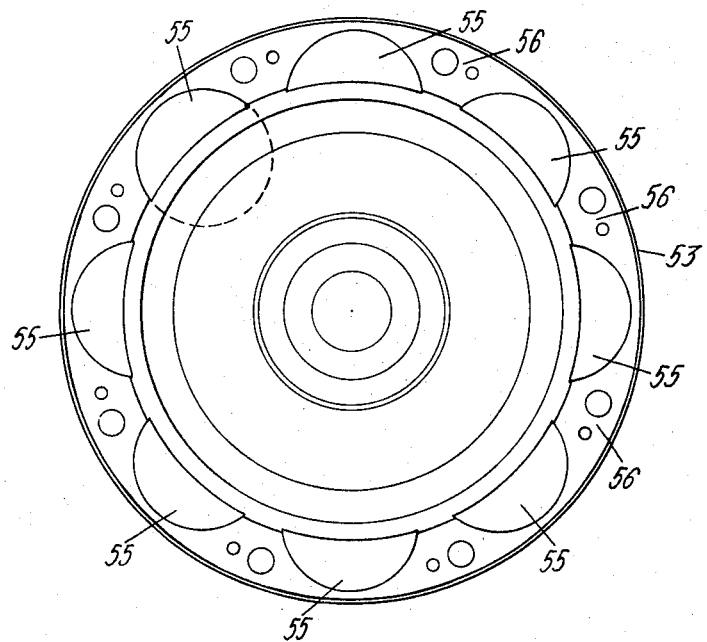
FIGURE 4 is a part sectional view on the line A—A of FIGURE 3.

Referring now to FIGURES 3 and 4 a gear device 50 is shown comprising a spur gear 51 adapted to be driven by gear 13 (not shown) and a bevel gear 52 adapted to be driven by spur gear 51 and to drive the bevel gear 16.

Bevel gear 52 is provided with an integral resilient flange 53 which constitutes the radially outer portion of bevel gear 52 and which is bolted to spur gear 51 by eight bolts 54. The abutting face of flange 53 is scalloped, as indicated at 55 in FIGURE 4, at equi-angularly spaced locations which alternate with the flats 56 through which bolts 54 pass.

When assembled, the abutting flange 53 and spur gear 51 provide eight equi-angularly spaced apart recesses 57 therebetween. Due to the scalloped form of these recesses, their radially inner edges are open, to provide inlets 60 to recesses 57 and their radially outer edges are normally closed. However, the resilient flange 53 is so designed that, under predetermined conditions its radially outer edge moves away from spur gear 51 thus providing outlets at 61 from recesses 57.

In use, the gear device is disposed within the internal wheel-case 62 of the gas turbine engine partly immersed in oil. Upon rotation of the main shaft of the engine, drive is transmitted from gear 13 via gear device 50 to bevel gear 16. Oil is centrifuged through inlets 60 into recesses 57. At a predetermined speed, the oil pressure within recesses 57 reaches a critical level at which resilient flange 53 is urged away from spur gear 51 thus opening outlets 61. The oil then flows through outlets 61, returning to the wheel-case 62, and a continuous flow of oil occurs through recesses 57.

The oil flow dampens any relative vibrations set up between spur gear wheel 51 and bevel gear wheel 52. These relative vibrations can be sufficiently great to cause failure of the gearing and thus the oil tends to increase the life of the gearing. Frettage and wear between the abutting faces of the gear device is also reduced due to the oil flow and its damping action.

I claim:
1. A gear device comprising a driving gear, a driven gear attached thereto, a resilient member extending between said driving and driven gears being attached to one of said gears and defining with the other said gear a chamber, and means for introducing fluid into said chamber whereby relative vibrations between said driving and driven gears may be dampened.

2. A gear device comprising a driving gear, a driven gear attached thereto, a resilient member extending between said driving and driven gears being integral with one of said gears and defining with the other said gear a chamber, and means for introducing fluid into said chamber whereby relative vibrations between said driving and driven gears may be dampened.

3. A gear device comprising a driving gear, a driven member attached thereto, a resilient gear extending between said driving and driven gears being attached to one of said gear and defining with the other said gear a chamber, an inlet and an outlet to said chamber, and means for introducing fluid into said chamber whereby fluid may flow continuously through said chamber from the inlet to the outlet thereof during operation of said device, and relative vibrations between said driving and driven gears may be dampened.

4. A gear device comprising a driving gear, a driven member attached thereto, a resilient gear extending between said driving and driven gears being integral with one of said gears and defining with the other said gear a chamber, an inlet and an outlet to said chamber, and means for introducing fluid into said chamber whereby fluid may flow continuously through said chamber from the inlet to the outlet thereof during operation of said device, and relative vibrations between said driving and driven gears may be dampened.

5. A gear device comprising a driving member, a driven member attached thereto, a resilient member extending between said driving and driven members being attached to one of said members and abutting the other said member and defining therewith a chamber, and means for introducing fluid into said chamber whereby relative vibrations between said driving and driven members may be dampened, the arrangement being such that, when the pressure of fluid introduced into said chamber reaches a predetermined value, said resilient member is forced away from the member which it normally abuts, thereby providing an outlet for said fluid.

6. A gear device comprising a driving member, a driven member attached thereto, a resilient member extending between said driving and driven members being integral with one of said members and abutting the other said member and defining therewith a chamber, and means for introducing fluid into said chamber whereby relative vibrations between said driving and driven members may be dampened, the arrangement being such that, when the pressure of fluid introduced into said chamber reaches a predetermined value, said resilient member is forced away from the member which it normally abuts, thereby providing an outlet for said fluid.

7. A gear device comprising a driving member, a driven member attached thereto, a resilient member extending between said driving and driven members being attached to one of said members and abutting said the other said member and defining therewith a chamber, said one member being apertured to provide inlets to said chamber and means for introducing fluid into said chamber, the arrangement being such that, when the pressure of fluid introduced into said chamber reaches a predetermined value, said resilient member is forced away from the member which it normally abuts, thereby providing an outlet for said fluid which flows continuously through said chamber from the inlet to the outlet thereof during operation of said device, whereby relative vibrations between said driving and driven members may be dampened.

8. A gear device comprising a driving gear wheel, a driven gear wheel attached thereto, said gear wheels being generally concave in cross-section, having their radially inner portions abutting, and their radially outer portions spaced apart, an annular resilient member extending between the radially outer portions of said driving and driven gear wheels and being attached to one of said gear wheels and defining with the other said gear wheel a chamber, and means for introducing fluid into said chamber whereby relative vibrations between said driving and driven gear wheels may be dampened.

9. A gear device comprising a driving gear wheel, a driven gear wheel attached thereto, said gear wheels being generally concave in cross-section, having their radially inner portions abutting, and their radially outer portions spaced apart, an annular resilient member extending between the radially outer portions of said driving and driven gear wheels and being attached to one of said gear wheels and defining with the other said gear wheel a chamber, an outlet from said chamber, means forming apertures in said one gear wheel disposed radially inwardly of the area in which said resilient member abuts the other gear wheel and forming inlets for said chamber, whereby fluid may pass from the inlets to the outlet of said chamber under the action of centrifugal force, and means for introducing fluid into said chamber whereby relative vibrations between said driving and driven gear wheels may be dampened.

10. A gear device comprising a driving gear wheel, a driven gear wheel, said gear wheels having their radially outer portions abutting and their radially inner portions spaced apart, a resilient member integral with one of said gear wheels and having a radially outer portion which is bolted to the radially outer portion of the other said wheel at angularly spaced locations and which is spaced from the radially outer portion of said other wheel between said spaced locations to form a plurality of angularly spaced apart recesses which together constitute a chamber, and means for introducing fluid into said chamber whereby relative vibrations between said driving and driven wheels may be dampened.

11. A gear device comprising a driving gear wheel, a driven gear wheel, said gear wheels having their radially outer portions abutting and their radially inner portions spaced apart, a resilient member integral with one of said gear wheels and having a radially outer portion which is bolted to the radially outer portion of said other gear wheel at angularly spaced locations and which is spaced from the radially outer portion of said other gear wheel between said spaced locations by scallops formed in said resilient member to provide a plurality of angularly spaced apart recesses which together constitute a chamber, and means for introducing fluid into said chamber whereby relative vibrations between said driving and driven wheels may be dampened.

12. A gear device comprising a driving gear wheel, a driven gear wheel, said gear wheels having their radially outer portions abutting and their radially inner portions spaced apart, a resilient member integral with one of said wheel and having a radially outer portion which is bolted to the radially outer portion of the other said wheels at angularly spaced locations and which is spaced from the radially outer portion of said other wheel between said spaced locations to form a plurality of angularly spaced apart recesses which together constitute a chamber, said recesses being provided with radially inner edges which are open to provide inlets to said chamber and being provided with radially outer edges which are normally closed by the abutting resilient member and other gear wheel but which are adapted to move apart to provide outlets from said chamber, and means for introducing fluid into said chamber whereby relative vibrations between said driving and driven wheels may be dampened.

13. A gear device comprising a driving gear wheel, a driven gear wheel attached thereto, said gear wheels being generally concave in cross-section, having their radially inner portions abutting, and their radially outer portions spaced apart, an annular resilient member extending between the radially outer portions of said driving and driven gear wheels and being attached to one of said gear wheels and defining with the other said gear wheel a chamber, an outlet from said chamber, means forming apertures in said one gear wheel disposed radially inwardly of the area in which said resilient member abuts the other gear wheel and forming inlets for said chambers, whereby fluid may pass from the inlets to the outlet of said chamber under the action of centrifugal force, and a casing containing fluid within which said gear device is disposed, the fluid within said casing flowing, during rotation of said gear device, through said inlets, through the chamber, and out through said outlets thus returning to said casing whereby relative vibrations between said driving and driven wheels may be dampened.

14. A gear device comprising a driving gear wheel, a driven gear wheel, said gear wheels having their radially outer portions abutting and their radially inner portions spaced apart, a resilient member integral with one of said gear wheels and having a radially outer portion which is bolted to the radially outer portion of the other said gear wheel at angularly spaced locations and which is spaced from the radially outer portion of said other gear wheel between said spaced locations to form a plurality of angularly spaced apart recesses which together constitute a chamber, said recesses being provided with radially inner edges which are open to provide inlets to said chamber and being provided with radially outer edges which are normally closed by the resilient member and other gear wheel but which are adapted to move apart to provide outlets from said chamber, and a casing containing fluid within which said gear device is disposed, the fluid within said casing flowing, during rotation of said gear device, through said inlets, through the chamber, and out through said outlets thus returning to said casing whereby relative vibrations between said driving and driven gear wheels may be dampened.

15. In a gas turbine engine, a gear device comprising a driving gear wheel, a driven gear wheel attached thereto, a lay-shaft on which said gear wheels are mounted, a compressor shaft for said engine, an auxiliary of the engine, a first gear wheel mounted on the compressor shaft and driving said driving gear wheel, a second gear wheel forming part of said auxiliary and being driven by said driven gear wheel, a resilient member extending between said driving and driven gear wheels being attached to one of said driving and driven gear wheels and defining with the other said gear wheel a chamber, and means for introducing fluid into said chamber, whereby relative vibrations between said driving and driven gear wheels may be dampened.

References Cited
UNITED STATES PATENTS

| | | | |
|---|---|---|---|
| 1,185,953 | 6/1916 | Sundh | 74—443 |
| 1,271,362 | 7/1918 | Rainey | 74—574 |
| 1,375,688 | 4/1921 | Friz | 74—443 |
| 1,638,118 | 8/1927 | Ford | 74—443 |
| 1,813,819 | 7/1931 | Ross | 74—443 |
| 1,819,266 | 8/1931 | Rued | 74—443 |
| 1,939,173 | 12/1933 | Junkers | 74—574 |
| 2,194,917 | 3/1940 | Thege | 74—574 |

DONLEY J. STOCKING, *Primary Examiner.*

DAVID J. WILLIAMOWSKY, *Examiner.*

L. H. GERIN, *Assistant Examiner.*